United States Patent
Wawersig et al.

(10) Patent No.: US 11,143,321 B2
(45) Date of Patent: Oct. 12, 2021

(54) FLUIDIC VALVE UNIT AND METHOD FOR OPERATING A FLUIDIC VALVE UNIT

(71) Applicant: AUDI AG, Ingolstadt (DE)

(72) Inventors: Sebastian Wawersig, Ingolstadt (DE); Thomas Hoffmann, Riedenburg (DE)

(73) Assignee: AUDI AG, Ingolstadt (DE)

( * ) Notice: Subject to any disclaimer, the term of this patent is extended or adjusted under 35 U.S.C. 154(b) by 110 days.

(21) Appl. No.: 16/582,379

(22) Filed: Sep. 25, 2019

(65) Prior Publication Data
US 2020/0124204 A1   Apr. 23, 2020

(30) Foreign Application Priority Data

Oct. 22, 2018   (DE) .......................... 102018218054.7

(51) Int. Cl.
*F16K 11/16*    (2006.01)
*F16K 31/04*    (2006.01)
(Continued)

(52) U.S. Cl.
CPC .......... *F16K 11/165* (2013.01); *F16D 1/0876* (2013.01); *F16D 3/18* (2013.01); *F16K 11/076* (2013.01); *F16K 27/003* (2013.01); *F16K 31/041* (2013.01); *F16K 31/043* (2013.01); *F16K 31/508* (2013.01)

(58) Field of Classification Search
CPC .... F16K 11/165; F16K 11/076; F16K 27/003; F16K 31/043; F16K 5/0647; F15B 13/0406; F16D 3/18; Y10T 137/87249; Y10T 137/86533; Y10T 137/86863;
(Continued)

(56) References Cited

U.S. PATENT DOCUMENTS

| | | | |
|---|---|---|---|
| 8,584,708 B2* | 11/2013 | Bartnick | F16K 11/165 137/870 |
| 8,757,110 B2* | 6/2014 | Triebe | F01P 7/14 123/41.1 |

(Continued)

FOREIGN PATENT DOCUMENTS

| | | |
|---|---|---|
| CN | 102954259 A | 3/2013 |
| CN | 105473835 A | 4/2016 |

(Continued)

OTHER PUBLICATIONS

German Office Action dated Oct. 10, 2019, in connection with corresponding DE Application No. 10 2018 218 054.7 (13 pgs., including machine-generated English translation).

(Continued)

*Primary Examiner* — Seth W. Mackay-Smith
(74) *Attorney, Agent, or Firm* — Maier & Maier, PLLC

(57) ABSTRACT

A fluidic valve unit having a plurality of rotary slide valves arranged in series and a servo motor for setting the rotary slide valves, wherein each of the rotary slide valves comprises a rotary slide arranged in a rotary slide housing and drivable via a driveshaft by means of the servo motor. It is provided in this case that each two successive ones of the rotary slide valves are mechanically connected to one another via a driver device for the setting by means of the servo motor, wherein the driver device comprises a driver projection arranged on a first of the two rotary slide valves.

11 Claims, 3 Drawing Sheets

(51) Int. Cl.
*F16K 11/076* (2006.01)
*F16K 27/00* (2006.01)
*F16D 1/08* (2006.01)
*F16D 3/18* (2006.01)
*F16K 31/50* (2006.01)

(58) Field of Classification Search
CPC ..... Y10T 137/86847; Y10T 137/87113; Y10T 137/87016
USPC .................................................. 251/129.11
See application file for complete search history.

(56) References Cited

U.S. PATENT DOCUMENTS

| | | | | |
|---|---|---|---|---|
| 9,212,632 | B2* | 12/2015 | Vitiello | F02D 11/10 |
| 9,500,299 | B2* | 11/2016 | Morein | F16K 41/026 |
| 9,657,861 | B2* | 5/2017 | Enomoto | F16K 31/04 |
| 9,841,115 | B2* | 12/2017 | Gramss | F16K 11/08 |
| 9,903,257 | B2* | 2/2018 | Heldberg | F16K 11/08 |
| 9,945,283 | B2* | 4/2018 | Muizelaar | F01P 7/14 |
| 10,012,294 | B2* | 7/2018 | Kubo | F16H 55/17 |
| 2009/0050830 | A1* | 2/2009 | Albert | F16K 35/14 |
| | | | | 251/129.11 |
| 2012/0160192 | A1* | 6/2012 | Magnier-Cathenod | F01P 7/14 |
| | | | | 123/41.08 |
| 2015/0286224 | A1* | 10/2015 | Bartonek | F16K 11/0873 |
| | | | | 236/101 R |
| 2016/0178081 | A1* | 6/2016 | Gramss | F16K 11/08 |
| | | | | 137/468 |
| 2016/0201546 | A1* | 7/2016 | Heldberg | F16K 11/08 |
| | | | | 123/41.08 |
| 2016/0281585 | A1* | 9/2016 | Muizelaar | F16K 31/042 |
| 2016/0341331 | A1* | 11/2016 | Lueders | F01P 7/14 |

FOREIGN PATENT DOCUMENTS

| | | |
|---|---|---|
| CN | 105723064 A | 6/2016 |
| CN | 205298130 U | 6/2016 |
| DE | 102006059029 A1 | 6/2008 |
| DE | 102007019064 B3 | 8/2008 |
| DE | 10 2009 004 157 B3 | 4/2010 |
| DE | 10 2012 214 845 A1 | 2/2013 |
| DE | 10 2013 109 365 A1 | 3/2015 |
| DE | 102011119237 B4 | 10/2015 |
| DE | 102015210157 A1 | 12/2015 |
| DE | 102014011746 A1 | 2/2016 |
| DE | 102016004705 A1 | 10/2017 |

OTHER PUBLICATIONS

Chinese Office Action dated May 18, 2021, in connection with corresponding CN Application No. 201910998653.6 (14 pp., including machine-generated English translation).

* cited by examiner

FLUIDIC VALVE UNIT AND METHOD FOR OPERATING A FLUIDIC VALVE UNIT

FIELD

The disclosure relates to a fluidic valve unit having a plurality of rotary slide valves arranged in series and a servo motor for setting the rotary slide valves, wherein each of the rotary slide valves comprises a rotary slide arranged in a rotary slide housing and drivable via a driveshaft by means of the servo motor. The invention furthermore relates to a method for operating a fluidic valve unit.

BACKGROUND

Document DE 10 2006 059 029 A1 is known from the prior art, for example. It describes a rotary slide having a plurality of cross section adjustment elements, wherein the cross section adjustment elements are each connected via a rotary drive to a common driveshaft.

SUMMARY

It is the object of the invention to propose a fluidic valve unit having a plurality of rotary slide valves which has advantages over known fluidic valve units, in particular enables a flexible setting of the plurality of rotary slide valves, preferably by means of a single servo motor.

This is achieved according to the invention by a fluidic valve unit having the features of claim 1. It is provided in this case that each two successive ones of the rotary slide valves are mechanically connected to one another via a driver device for setting by means of the servo motor, wherein the driver device comprises a driver projection arranged on a first of the two rotary slide valves, which engages in a driver receptacle formed on the respective other second of the rotary slide valves with play in the rotational direction, and wherein one of the two rotary slide valves is only drivable indirectly via the respective other of the two rotary slide valves by means of the servo motor for the setting.

The fluidic valve unit is used for setting a through-flow cross-sectional area, i.e., the size of a through-flow cross section, between at least one fluid inlet and at least one fluid outlet of the valve unit. For example, the valve unit comprises at least as many fluid outlets as fluid inlets, wherein at least one of the fluid outlets or a plurality of the fluid outlets are associated with each of the fluid inlets. It can thus be provided that with the aid of the valve unit, the through-flow cross-sectional area between precisely one fluid inlet and precisely one fluid outlet or the respective through-flow cross-sectional area between each of the fluid inlets and the associated at least one of the fluid outlets can be set.

The valve unit particularly preferably comprises one fluid inlet and a plurality of fluid outlets assigned to this fluid inlet, wherein the fluid provided at the fluid inlet is supplied to none of the fluid outlets, exclusively one single one of the fluid outlets, or a plurality of the fluid outlets in dependence on a setting of the valve unit. This means that in dependence on the setting of the valve unit, a specific through-flow cross-sectional area is set in each case between the fluid inlet and each of the fluid outlets, which can be nonzero in each case, but can also be equal to zero to block the respective fluid connection between the fluid inlet and the corresponding fluid outlet.

The valve unit has a plurality of rotary slide valves for setting the through-flow cross-sectional area between the respective fluid inlet and the respective fluid outlet. Each of these rotary slide valves in turn comprises a rotary slide which is arranged in the respective rotary slide housing. The rotary slide housing of the rotary slide can of course also be designed as a common rotary slide housing. The rotary slide is mounted so it is rotatable around an axis of rotation in the rotary slide housing.

Each of the rotary slide valves has at least one inlet and at least one outlet. A specific through-flow cross-sectional area is provided between the inlet and the outlet in dependence on the rotational angle position of the rotary slide in the rotary slide housing. It can be provided, for example, that the inlets of the rotary slide valves are fluidically connected to separate fluid inlets of the valve unit fluidically independently of one another, and similarly thereto, the outlets of the rotary slide valves are fluidically connected to fluid outlets of the valve unit fluidically independently of one another.

However, it can also be provided that the inlets of the rotary slide valves are each fluidically connected to the one fluid inlet of the valve unit, so that the rotary slide valves are each connected on the intake side to the fluid inlet of the valve unit. The outlets of the rotary slide valves are preferably each fluidically connected to fluid outlets of the valve unit fluidically independently of one another, in particular each of the outlets to precisely one of the fluid outlets. Of course, however, it can also be provided here that the outlets of a plurality of the rotary slide valves or all rotary slide valves are fluidically connected to one of the fluid outlets or the one fluid outlet, respectively, of the valve unit.

For example, in a first rotational angle position of the rotary slide, a fluid connection having a first through-flow cross-sectional area is provided between the respective inlet and the respective outlet, while in contrast in a second rotational angle position, the fluid connection is provided having a second through-flow cross-sectional area different from the first through-flow cross-sectional area. For example, in the first rotational angle position of the rotary slide, a fluid connection having a first through-flow cross-sectional area is thus provided between the fluid inlet and a first of the fluid outlets, while in contrast a second of the fluid outlets is fluidically decoupled from the fluid inlet. In the second rotational angle position, in contrast, the first fluid outlet is fluidically decoupled from the fluid inlet, while in contrast the second of the fluid outlets has a flow connection to the fluid inlet having a specific second through-flow cross-sectional area. The first through-flow cross-sectional area and the second through-flow cross-sectional area can have the same value in this case or can also be different from one another.

It can thus be provided that the plurality of rotary slide valves are fluidically connected to the same fluid inlet of the valve unit, so that with the aid of the rotary slide valves, the fluid provided at the fluid inlet can be distributed to a plurality of fluid outlets. However, it can also be provided that each of the rotary slide valves comprises a separate fluid inlet, so that the above statements can be used for each of the rotary slide valves or each of the rotary slides, respectively.

The setting of the valve unit, i.e., the actuation and/or rotation of the rotary slides inside the rotary slide housing, is performed by means of the servo motor. The driveshaft, via which the servo motor can drive the respective rotary slide, is connected to the servo motor, in particular to a motor shaft of the servo motor. The servo motor is preferably provided as an electric motor. Other types of motors can also be used in principle, however. The servo motor is particularly preferably the only servo motor of the fluidic valve unit, by means of which the rotary slide valves are actuatable and/or settable.

The rotary slides of the rotary slide valves are drivable, in particular selectively drivable, by means of the servo motor, i.e., the same servo motor. For this purpose, the rotary slide valves are arranged in series with respect to drive, so that one of the rotary slide valves is thus directly drivable by means of the servo motor and the at least one further rotary slide valve or the further rotary slide valves, respectively, are only drivable indirectly with the aid of the servo motor, namely via the one rotary slide valve. Each of the rotary slide valves is thus drivable by means of the servo motor via the respective one of the rotary slide valves located before it in series.

For this purpose, each two successive ones of the rotary slide valves are mechanically connected to one another and/or mechanically attached to one another via the driver device or one such driver device, respectively. One such driver device is preferably arranged in each case between each two of the rotary slide valves. This means that each of the rotary slide valves is connected with respect to drive on one of the rotary slide valves arranged upstream in series, in particular directly, via one such driver device in each case.

Solely by way of example, a first of the rotary slide valves is thus attached directly to the servo motor, a second of the rotary slide valves is attached via a first driver device to the first rotary slide valve, and a third of the rotary slide valves is attached via a second driver device to the second rotary slide valve, so that a series circuit of the rotary slide valves is provided via the driver devices. When the driver device is discussed in the scope of this description, the statements are thus always transferable to each one of the driver devices if not otherwise indicated.

The driver device has the driver projection and the driver receptacle for selectively connecting two rotary slide valves to one another. The driver projection is associated with the first of the rotary slide valves connected by means of the driver device and the driver receptacle is associated with the second of the rotary slide valves connected by means of the driver device. The driver projection engages in the driver receptacle with play in the rotational direction. In this case, the driver projection is arranged eccentrically, so that during a rotational movement of at least one of the rotary slide valves, a displacement of the driver projection takes place in the circumferential direction. The driver receptacle is designed in such a way that the driver projection is displaceable therein with play in the circumferential direction.

The driver receptacle is delimited on both sides, however, so that the play is also delimited in the circumferential direction. This means that during a rotational movement of a first of the two rotary slide valves, the respective other second of the rotary slide valves is decoupled from the first rotary slide valve as long as the driver projection is displaceable with play in the driver receptacle. If the play is exhausted, the two driver slide valves are thus coupled to one another with respect to drive by interaction of the driver projection and the driver receptacle and/or the delimitation thereof, so that subsequently one of the two rotary slide valves drives the respective other of the rotary slide valves by the interaction of the driver projection with the driver receptacle. One of the two rotary slide valves is solely drivable indirectly via the respective other of the two rotary slide valves by means of the servo motor in this case, wherein the latter rotary slide valve, for example, is directly coupled with respect to drive to the servo motor or is also only indirectly drivable with the aid of the servo motor via at least one further rotary slide valve.

The described design of the valve unit enables the driving and/or setting of an arbitrary number of rotary slide valves by means of only one single servo motor. The driver device or the driver devices, respectively, are designed like a safe mechanism. It is provided that during the setting of the rotary slide valves by means of the servo motor, firstly the rotary slide valve most remote from the servo motor with respect to drive is set via the respective rotary slide valves located in series between the servo motor and this rotary slide valve. The setting is continued step-by-step for the rotary slide valves located closer with respect to drive to the servo motor until finally the rotary slide valve closest to the servo motor is set. This enables particularly flexible and independent setting of the rotary slide valves.

A further design of the invention provides that the driver receptacle is delimited on each of opposing sides in the rotational direction by an end stop for the driver projection. The driver receptacle is thus delimited on both sides and comprises two end stops for this purpose. One of the end stops delimits the driver receptacle in the circumferential direction in a first direction and a second of the end stops delimits it in a second direction opposite to the first direction. The end stops are spaced apart from one another in such a way that the driver projection is provided with play in the driver receptacle. In other words, the end stops have a distance from one another in the circumferential direction which is greater than the dimensions of the driver projection in this direction. The described design of the driver receptacle is easily technically implementable and nonetheless enables the flexible setting of the rotary slide valves.

In the scope of a further preferred embodiment of the invention, it is provided that the driver receptacle has an extension of at least 180°, at least 270°, at least 300°, at least 330°, at least 345°, or at least 350° in the rotational direction. The larger the driver receptacle is in the circumferential direction, the more flexibly may the rotary slide valves be set, in particular, a higher number of rotary slide valves is adjustable by means of the servo motor as the driver receptacle becomes larger in the circumferential direction.

A further design of the invention provides that the driver projection and the driver receptacle are associated with a driver unit and the two successive rotary slide valves are mechanically connected to one another via a further driver unit by means of the servo motor, wherein the further driver unit comprises a further driver projection on the first rotary slide valve and a further driver receptacle on the second rotary slide valve, in which the further driver projection engages with play in the rotational direction. The further driver unit is provided in addition to the driver unit and is also part of the driver device. Similarly to the driver unit, it has the further driver projection and the further driver receptacle.

For example, the further driver projection is associated with the same rotary slide valve as the driver projection and similarly the further driver receptacle is associated with the same rotary slide valve as the driver receptacle. However, it can also be provided that the further driver projection is associated with the same rotary slide valve which is associated with the driver receptacle and, vice versa, the further driver receptacle is associated with the same rotary slide valve with which the driver projection is also associated.

The respective elements associated with the same rotary slide valve are permanently connected to one another in a rotationally-fixed manner. For example, the driver projection and the further driver projection are permanently connected to one another in a rotationally-fixed manner and the driver receptacle and also the further driver receptacle are also. The further driver projection is provided eccentrically similarly to the driver projection and engages with play in the further driver receptacle. The play with which the further driver projection engages in the further driver receptacle is preferably equal to the play of the driver projection in the driver receptacle.

Preferably, those of the driver elements, i.e., the driver projection, the further driver projection, the driver receptacle, and the further driver receptacle, which are associated with the same rotary slide valve are preferably arranged and/or formed on a common main body. The main body is formed disk-shaped, for example, and thus has a substantially cylindrical form. For example, the driver projection and the further driver projection originate from a first of the main bodies, while the driver receptacle and the further driver receptacle are formed on the second of the main bodies.

One of the main bodies is coupled in a rotationally-fixed manner to a first of the rotary slide valves and another of the main bodies is coupled in a rotationally-fixed manner to a second of the rotary slide valves. Each of the main bodies is thus connected in a rotationally-fixed manner to one of the rotary slide valves, which are connected to one another via the corresponding driver device. In particular, each of the main bodies can comprise, for example, a shaft receptacle for accommodating a shaft of the respective rotary slide valve for this purpose, wherein the shaft receptacle is preferably non-round viewed in cross section to establish a formfitting connection to the respective shaft. However, the shaft receptacle is solely optional. A fixed connection can also be provided between the main body and a shaft connected to the rotary slide valve or—alternatively—the main body can be provided on the respective rotary slide of the rotary slide valve or the main body can be part of the rotary slide or can be formed thereby, respectively.

The use of the further driver unit in addition to the driver unit enables a force equalization during the driving of the rotary slide valves connected via the driver device or its driver units, respectively. The driver units, i.e., the driver unit and the further driver unit, are thus preferably designed in such a way that during the driving of the rotary slide valves, which occurs via the driver device, via the driver units, a torque and/or a force is only transmitted in the circumferential direction, while in contrast the effect of a force oriented in the radial direction is substantially or even completely avoided. For this purpose, the driver unit and the further driver unit are preferably arranged and/or formed symmetrically in relation to one another.

A further preferred design of the invention provides that the driver unit and the further driver unit are free of overlap in the radial direction. This means that the driver projection does not engage in the further driver receptacle and the further driver projection does not engage in the driver receptacle, but rather is displaceable freely of the corresponding end stops in the circumferential direction. A particularly large amount of play in the rotational direction or circumferential direction can be achieved in this way.

A further embodiment of the invention provides that the driver unit and the further driver unit are formed for coupling the two rotary slide valves in the same relative position. This finally means that the driver unit and the driver receptacle are arranged symmetrically at least viewed in the circumferential direction in relation to the further driver unit and the further driver receptacle, so that during a torque transmission via the driver unit, a torque transmission takes place simultaneously via the further driver unit and vice versa. At the same time, the further driver projection is to be provided spaced apart from the end stops of the further driver receptacle, if the driver projection is also arranged spaced apart from the end stops of the driver receptacle. The above-mentioned action of forces in the radial direction is avoided particularly effectively in this way.

One refinement of the invention provides that the driver projection comprises a curved contact surface, which presses against a corresponding curved counter contact surface of one of the end stops in at least one position. The ability to transmit a particularly high torque is ensured by means of such a design. The contact surface and the counter contact surface are designed in such a way that they press flatly against one another in the at least one position, so that the torque transmission via the driver unit is effectuated via the planar contact between the contact surface and the counter contact surface. The planar contact is to be understood as pressing against over a continuous surface, which is to be differentiated from a linear contact and a point contact. For example, the contact surface is convexly curved viewed in the circumferential direction and the counter contact surface is concavely curved for the accommodation of driver projection by the respective end stop. The further driver projection and the further driver receptacle are particularly preferably also embodied accordingly.

One preferred refinement of the invention provides that at least one of the rotary slide valves comprises first gear teeth, which interact at least sometimes with second gear teeth of a further rotary slide valve for the driving of the further rotary slide valve by the one rotary slide valve, wherein the first gear teeth at least sometimes mesh directly with the second gear teeth or a gear wheel at least sometimes meshes with the first gear teeth and the second gear teeth. The first gear teeth and the second gear teeth are associated with the respective rotary slide valve. This means that the gear teeth are coupled at least with respect to drive to the corresponding rotary slide valve. For example, the respective gear teeth are formed directly on the rotary slide of the corresponding rotary slide valve.

For the drive connection of the rotary slide valves, the first gear teeth can mesh directly with the second gear teeth, so that the two sets of gear teeth thus intermesh. However, it can also be provided that the first gear teeth and the second gear teeth each mesh with the gear wheel, so that the rotary slide valves are connected to one another with respect to drive via this gear wheel. It can be provided that the two sets of gear teeth permanently interact with one another to permanently couple the two rotary slide valves to one another with respect to drive. However, it can also be provided that one of the two sets of gear teeth, preferably the first gear teeth, is only formed in regions, so that the gear teeth are disengaged from one another in at least one rotational angle position. In this way, the interaction of the gear teeth only sometimes is implemented for driving the further rotary slide valve by means of the rotary slide valve.

The two sets of gear teeth form—possibly together with the gear wheel—a gear wheel mechanism. The use of such a gear wheel mechanism has the advantage that the rotary slide valves can be arranged flexibly in relation to one another. Thus, for example, the further rotary slide valve can also be provided in series with the rotary slide valves. However, it can also be provided offset with respect to the rotary slide valves in the radial direction, so that an axis of rotation of the further rotary slide valve is arranged spaced apart, in particular spaced apart in parallel, from an axis of rotation of at least one of the rotary slide valves.

Finally, it is provided in one particularly preferred further design of the invention that the first gear teeth and/or the second gear teeth only partially enclose an axis of rotation of the respective rotary slide valve. Reference was already made thereto above. The only partial interaction of the gear teeth and thus the drive coupling only sometimes of the further rotary slide valve with the rotary slide valve is achieved by the only partial enclosure. Particularly flexible setting of the rotary slide valve and the further rotary slide valve is implementable in this way.

The invention furthermore relates to a method for operating a fluidic valve unit having a plurality of rotary slide valves arranged in series and a servo motor for setting the rotary slide valves, in particular a fluidic valve unit according to the statements in the scope of this description, wherein each of the rotary slide valves comprises a rotary slide which is arranged in a rotary slide housing and is drivable via a driveshaft by means of the servo motor. It is provided in this case that each two successive ones of the rotary slide valves are mechanically connected to one another via a driver device for the setting by means of the servo motor, wherein the driver device comprises a driver projection arranged on the first of the two rotary slide valves, which engages in a driver receptacle formed on the respective other second of the rotary slide valves with play in the rotational direction, and wherein one of the two rotary slide valves is only driven indirectly via the respective other of the two rotary slide valves by means of the servo motor for the setting.

The advantages of such a procedure or such a design of the fluidic valve unit were already indicated. Both the fluidic valve unit and also the method for the operation thereof can be refined according to the statements in the scope of this description, so that reference is thus made thereto.

BRIEF DESCRIPTION OF THE DRAWINGS

The invention is explained in greater detail hereafter on the basis of the exemplary embodiments illustrated in the drawings, without restricting the invention. In the figures.

DETAILED DESCRIPTION

Figure 1:
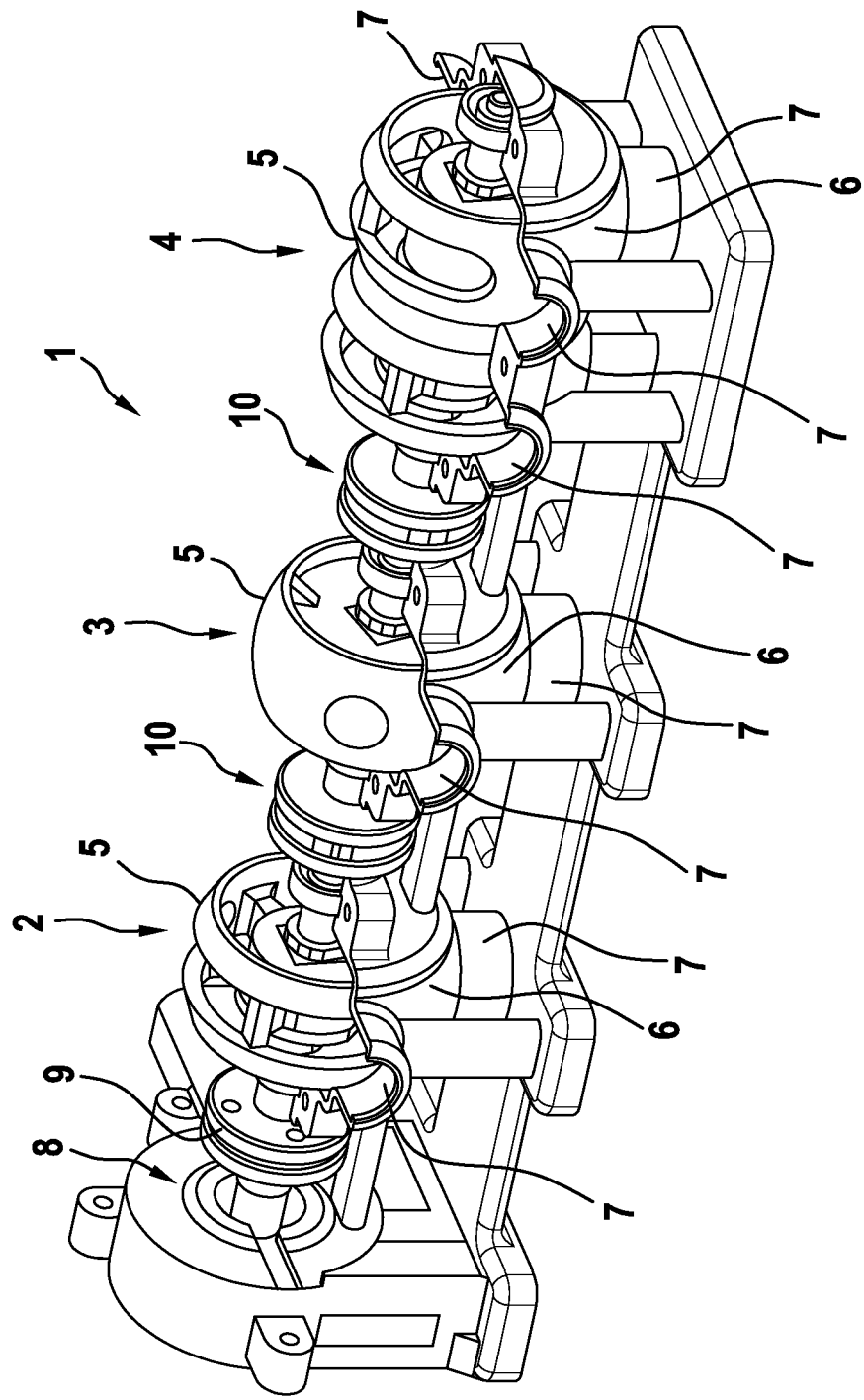
FIG. 1 shows a schematic illustration of a fluidic valve unit having a plurality of rotary slide valves arranged in series and a servo motor.

FIG. 1 shows a schematic illustration of a fluidic valve unit 1, which comprises a plurality of rotary slide valves 2, 3, and 4. A rotary slide 5 and a part of a rotary slide housing 6 are shown of each of the rotary slide valves 2, 3, and 4. The rotary slide valves 2, 3, and 4 each comprise a plurality of fluid fittings 7, wherein one of the fluid fittings 7 is designed as an inlet and another of the fluid fittings 7 is designed as an outlet. The rotary slide valves 2, 3, and 4 are drivable by means of a common servo motor 8. The servo motor 8 is coupled either directly or via a clutch 9 to the rotary slide valve 2. The rotary slide valve 2 is thus driven directly by the servo motor 8. The clutch 9 can be designed as a fixed clutch or as a shift clutch.

A driver device 10 is arranged in each case between each two of the rotary slide valves 2, 3, and 4, which at least sometimes couples the rotary slide valves 2, 3, and 4 to one another with respect to drive. The driver devices 10 are designed, for example, having the rotary slide valves 2, 3, and 4. In the exemplary embodiment shown here, a first of the driver devices 10 is provided between the rotary slide valve 2 and the rotary slide valve 3 and a second of the driver devices 10 is provided between the rotary slide valve 3 and the rotary slide valve 4. The driver device 10 is designed like a safe mechanism, so that the rotary slide valves 2, 3, and 4 are settable in succession by operating the servo motor 8 in opposing rotational directions.

For example, a target value is predetermined in each case for each of the rotary slide valves 2, 3, and 4. The setting of the target values at the rotary slide valves 2, 3, and 4 is performed starting from the one of the rotary slide valves 2, 3, and 4 arranged most remote with respect to drive from the servo motor 8, i.e., from the rotary slide valve 4 here. If the rotary slide valve 4 is set to the target value, subsequently the rotary slide valve 3 and—after the setting of the rotary slide valve 3 to a target value—the rotary slide valve 2 are thus set successively, also to the corresponding target value. With the aid of the driver device 10, an independent setting of the rotary slide valves 2, 3, and 4 to a respective desired target value is thus possible. The independent setting is to be understood in this case as the setting to a respective target value, wherein the target values of the rotary slide valves 2, 3, and 4 are not independent of one another. The independent setting of the rotary slide valves 2, 3, and 4 is thus performed to target values independent of one another.

Figure 2:
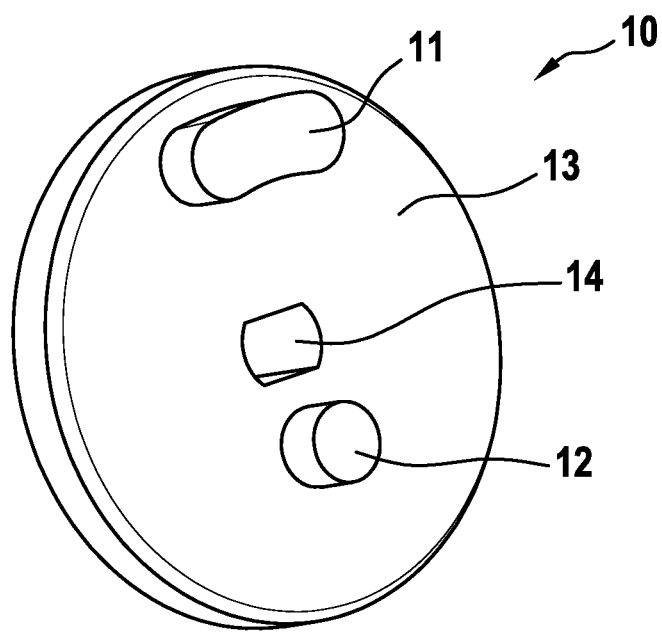
FIG. 2 shows a first part of a driver device arranged between each two of the rotary slide valves, which comprises a driver unit and a further driver unit.

FIG. 2 shows a schematic illustration of a first part of the driver device 10. The driver device 10 has a driver projection 11 and a further driver projection 12. They are arranged on a common main body 13. Moreover, a shaft receptacle 14 is formed—solely optionally—for a driveshaft of one of the rotary slide valves 2, 3, and 4 in the main body 13. It can be seen that the driver projection 11 and the further driver projection 12 are arranged offset in relation to one another in the radial direction with respect to a longitudinal center axis of the shaft receptacle 14. Moreover, the driver projections 11 and 12 are arranged eccentrically with respect to the longitudinal center axis and thus also with respect to an axis of rotation of the rotary slides 5 of the rotary slide valves 2, 3, and 4. In the case of the integrated design of the driver devices 10 with the rotary slide valves 2, 3, and 4, the main bodies 13 are, for example, part of the rotary slides 5 or are formed thereby, respectively.

Figure 3:
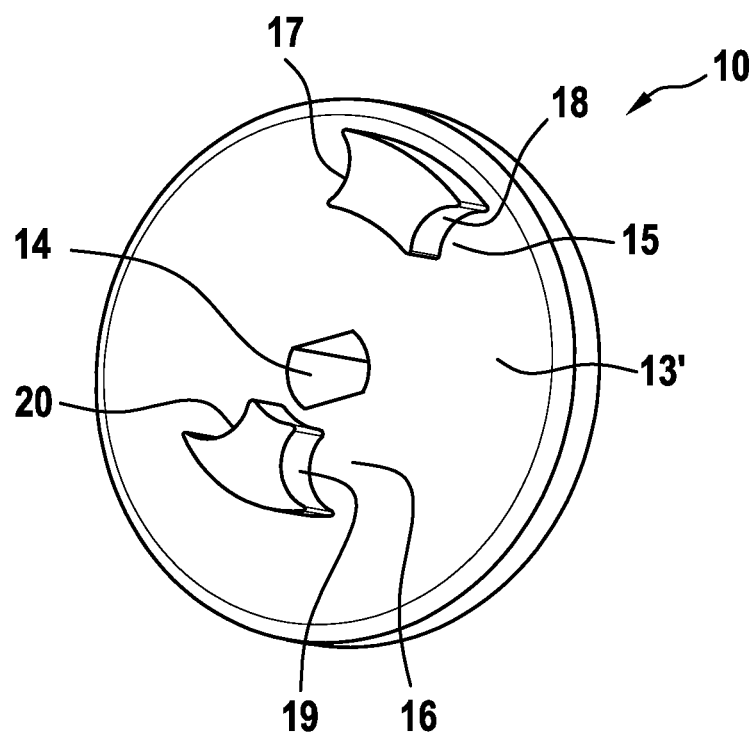
FIG. 3 shows a schematic illustration of a second part of the driver device having the driver unit and the further driver unit.

FIG. 3 shows a schematic illustration of a second part of the driver device 10. It can be seen that the driver device 10 comprises, in addition to the driver projection 11 and the further driver projection 12, a driver receptacle 15 and a further driver receptacle 16. The driver receptacle 15 and the further driver receptacle 16 are formed on and/or in a further main body 13'. The driver device 10 is designed in such a way that the driver projection 11 engages in the driver receptacle 15 and the further driver projection 12 engages in the further driver receptacle 16, specifically preferably permanently. The driver receptacle 15 is delimited in the circumferential direction with respect to a longitudinal center axis of a shaft receptacle 14, which is also provided here, on each of both sides by an end stop 17 or 18, respectively, for the driver projection 11. Similarly thereto, the further driver receptacle 16 is delimited by end stops 19 and 20 in the circumferential direction.

The driver receptacles 15 and 16 are designed in such a way that the driver projections 11 and 12 come into abutting contact with the respective end stops 17, 18, 19, and 20, respectively, simultaneously and/or in the same rotational angle position of the main bodies 13 and 13' in relation to one another. A torque transmission via the driver device 10 thus always takes place by simultaneous pressing of the driver projection 11 against one of the end stops 17 and 18 and pressing of the further driver projection 12 against one of the end stops 19 and 20. The occurrence of a force acting in the radial direction is substantially or even completely prevented in this way.

Figure 4:
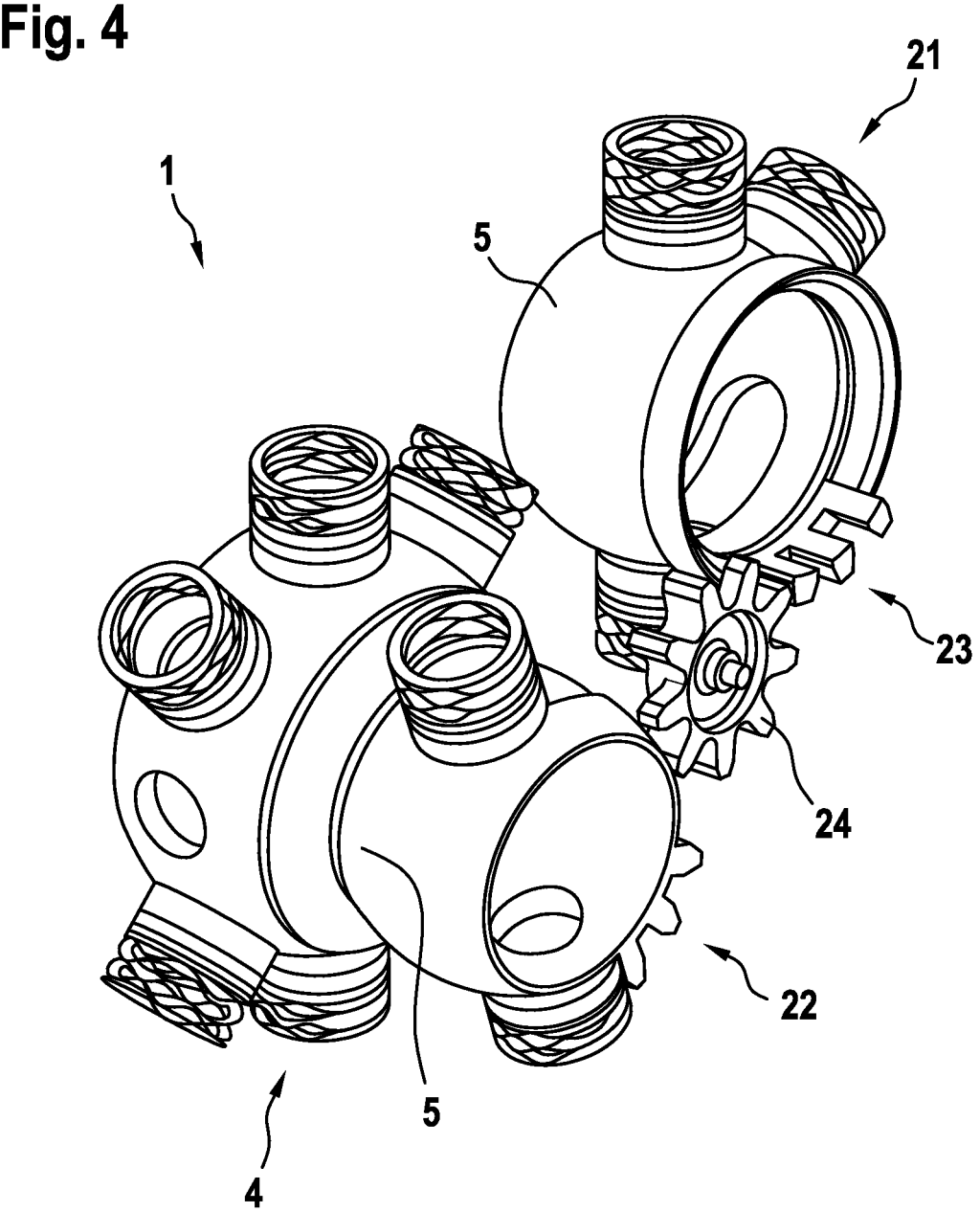
FIG. 4 shows a schematic illustration of the fluidic valve unit, wherein a further rotary slide valve is provided in addition to the rotary slide valves.

FIG. 4 shows a design of the fluidic valve unit 1, in which in addition to the rotary slide valves 2, 3, and 4, of which only the rotary slide valve 4 is shown here, a further rotary slide valve 21 is provided. This has a rotary slide 5, similarly to the rotary slide valves 2, 3, and 4. One of the rotary slide valves 2, 3, and 4, specifically the rotary slide valve 4 in the exemplary embodiment shown here, comprises first gear teeth 22, which at least sometimes interact with respect to drive with second gear teeth 23 of the further rotary slide valve 21. In the exemplary embodiment shown here, both the first gear teeth 22 and also the second gear teeth 23 mesh with a gear wheel 24, so that the further rotary slide valve 21 or the gear wheel 24 is coupled with respect to drive to the rotary slide valve 4. Alternatively, of course, it can also be provided that the two sets of gear teeth 22 and 23 mesh directly with one another.

The drive coupling of the rotary slide valves 4 and 21 by means of the gear teeth 22 and 23 has the advantage that the rotary slide valve 21 can be arranged substantially freely. In the exemplary embodiment shown here, it is provided adjacent to the rotary slide valves 2, 3, and 4, so that, for example, one axis of rotation of the further rotary slide valve 21 is arranged spaced apart in parallel in relation to an axis of rotation of the rotary slide valves 2, 3, and 4. It can be provided that the first gear teeth 22 and the second gear teeth 23 are each only partially formed in the circumferential direction. Of course, however, gear teeth 22 and/or 23 which are continuous in the circumferential direction are also implementable.

The described fluidic valve unit 1 has the advantage that extremely flexible setting of the rotary slide valves 2, 3, and 4 and also of the further rotary slide valve 21 is implementable by means of only one single servo motor 8. In this case, the rotary slide valves 2, 3, and 4 are coupled to one another via the driver devices 10. The further rotary slide valve 21, in contrast, is connected with respect to drive via the gear teeth 22 and 23.

The invention claimed is:

1. A fluidic valve unit, comprising:
a plurality of rotary slide valves arranged in series and a servo motor for setting the rotary slide valves,
wherein each of the rotary slide valves comprises a rotary slide arranged in a rotary slide housing and are drivable via a driveshaft by means of the servo motor,
wherein each two successive ones of the rotary slide valves are mechanically connected to one another via a driver device for setting by means of the servo motor,
wherein the driver device comprises a first driver projection and a second driver projection arranged on a first of the two successive rotary slide valves, which correspondingly and respectively engage with play in a rotational direction in a first driver receptacle and a second driver receptacle formed on a second of the two successive rotary slide valves,
wherein one of the two successive rotary slide valves is only drivable indirectly by the servo motor via a respective other of the two successive rotary slide valves,
wherein the first driver projection and the first driver receptacle together comprise a first driver unit, and the second driver projection and the second driver receptacle together comprise a second driver unit,
wherein the first driver unit and the second driver unit are arranged at different radii of the driver device such that neither the first driver unit nor the second driver unit overlap radially with one another, and
wherein the first and second driver projections each comprise a curved contact surface and the first and second driver receptacles each comprise a complementary contact surface which respectively matches the curved contact surface, such that when the first and second driver projections each respectively engage with the first and second driver receptacles, continuous curved contact surfaces result between the curved contact surface of the first driver projection and the complementary contact surface of the first driver receptacle and between the curved contact surface of the second driver projection and the complementary contact surface of the second driver receptacle.

2. The fluidic valve unit as claimed in claim 1, wherein the first and second driver receptacles are delimited on each of opposing sides in the rotational direction by an end stop for the first and second driver projections.

3. The fluidic valve unit as claimed in claim 2, wherein the first and second driver projections may rotate without engaging the first and second driver receptacles through an angle of at least 180°, at least 270°, at least 300°, at least 330°, at least 345°, or at least 350° in the rotational direction.

4. The fluidic valve unit as claimed in claim 2, wherein the first driver unit and the second driver unit are designed to couple the two successive rotary slide valves in the same relative position.

5. The fluidic valve unit as claimed in claim 1, wherein the first and second driver projections may rotate without engaging the first and second driver receptacles through an angle of at least 180°, at least 270°, at least 300°, at least 330°, at least 345°, or at least 350° in the rotational direction.

6. The fluidic valve unit as claimed in claim 5, wherein the first driver unit and the second driver unit are designed to couple the two successive rotary slide valves in the same relative position.

7. The fluidic valve unit as claimed in claim 1, wherein the first driver unit and the second driver unit are designed to couple the two successive rotary slide valves in the same relative position.

8. The fluidic valve unit as claimed in claim 1, wherein at least one of the rotary slide valves further comprises first gear teeth, which interact at least sometimes with second gear teeth of a further rotary slide valve for the driving of the further rotary slide valve by the one rotary slide valve, wherein the first gear teeth mesh directly at least sometimes with the second gear teeth or a gear wheel meshes at least sometimes with the first gear teeth and the second gear teeth.

9. The fluidic valve unit as claimed in claim 8, wherein the first gear teeth and/or the second gear teeth only partially enclose an axis of rotation of the respective rotary slide valve.

10. The fluidic valve unit as claimed in claim 1, wherein the first driver unit and the second driver unit are provided opposite one another about an axis of rotation.

11. A method for operating a fluidic valve unit having a plurality of rotary slide valves arranged in series and a servo motor for setting the rotary slide valves, comprising, setting each of the rotary slide valves to a desired position which results in a desired flow rate of the fluidic valve unit, wherein each of the rotary slide valves comprises a rotary slide arranged in a rotary slide housing and are drivable via a driveshaft by means of the servo motor, wherein each two successive ones of the rotary slide valves are mechanically connected to one another via a driver device for setting by means of the servo motor, wherein the driver device comprises a first driver projection and a second driver projection arranged on a first of the two successive rotary slide valves, which correspondingly and respectively engage with play in a rotational direction in a first driver receptacle and a second driver receptacle formed on a second of the two successive rotary slide valves, wherein one of the two successive rotary slide valves is only driven indirectly by the servo motor via a respective other of the two successive rotary slide valves, wherein the first driver projection and the first driver receptacle together comprise a first driver unit, and the second driver projection and the second driver receptacle together comprise a second driver unit, wherein the first driver unit and the second driver unit are arranged at different radii of the driver device such that neither the first driver unit nor the second driver unit overlap radially with one another, and wherein the first and second driver projections each comprise a curved contact surface and the first and second driver receptacles each comprise a complementary contact surface which respectively matches the curved contact surface, such that when the first and second driver projections each respectively engage with the first and second driver receptacles, continuous curved contact surfaces result between the curved contact surface of the first driver projection and the complementary contact surface of the first driver receptacle and between the curved contact surface of the second driver projection and the complementary contact surface of the second driver receptacle.

* * * * *